United States Patent [19]

Sato et al.

[11] 3,949,422
[45] Apr. 6, 1976

[54] TAPE RECORDER WITH PIVOTAL ERASE HEAD BEARING

[75] Inventors: Shoji Sato, Sendai; Kenji Yoshida, Tokyo; Kiyoshi Kikuchi, Togajo, all of Japan

[73] Assignee: Sony Corporation, Tokyo, Japan

[22] Filed: May 16, 1974

[21] Appl. No.: 470,653

[30] Foreign Application Priority Data

May 21, 1973 Japan.......................... 48-59591[U]

[52] U.S. Cl. ................. 360/96; 360/105; 360/129; 360/130
[51] Int. Cl.².. G11B 5/10; G11B 5/54; G11B 21/20
[58] Field of Search ............. 360/105, 96, 130, 118, 360/129; 242/199

[56] References Cited
UNITED STATES PATENTS

| 2,793,039 | 5/1957 | Hironimus | 360/105 |
| 3,404,223 | 10/1968 | Violette | 360/105 |
| 3,751,042 | 8/1973 | Platt | 360/96 |
| 3,812,536 | 5/1974 | Linke | 360/118 |
| 3,869,723 | 3/1975 | Yoshida | 360/96 |

*Primary Examiner*—Daryl W. Cook
*Assistant Examiner*—David K. Moore
*Attorney, Agent, or Firm*—Lewis H. Eslinger; Alvin Sinderbrand

[57] ABSTRACT

A tape recorder is provided with an erasing head, a bearing member for rotatably journaling a pinch roller and a pinch lever for supporting the bearing member, all of them being integrally combined. The erasing head has its slidable contact surface projected into the tape path side with one of its side surfaces being faced to the peripheral surface of the pinch roller, and upper and lower flanges thereof projected over the slidable contact surface are used to guide a tape therebetween.

5 Claims, 5 Drawing Figures

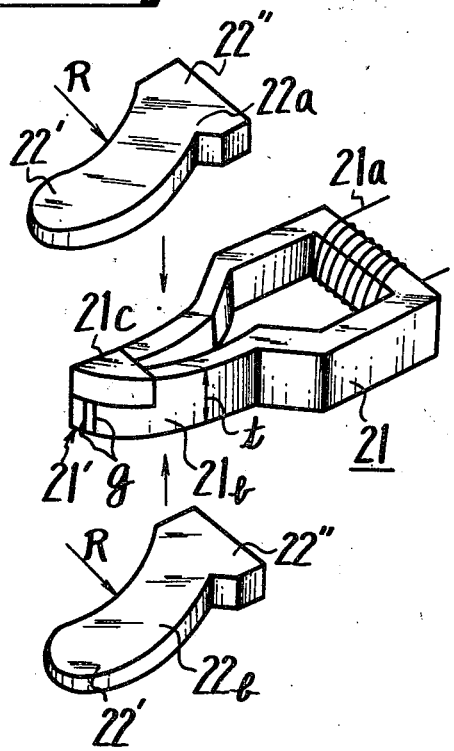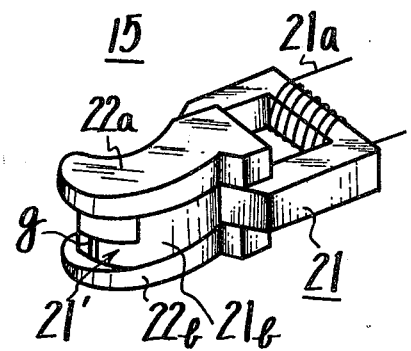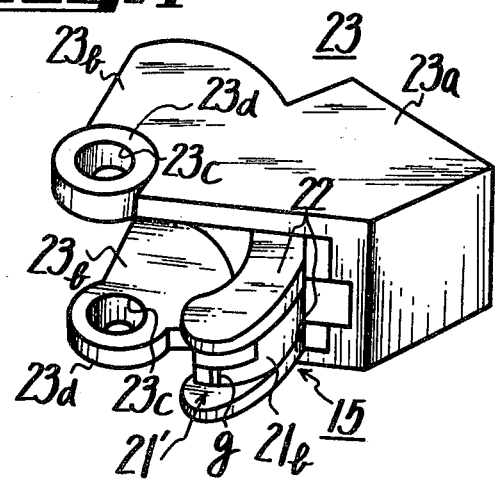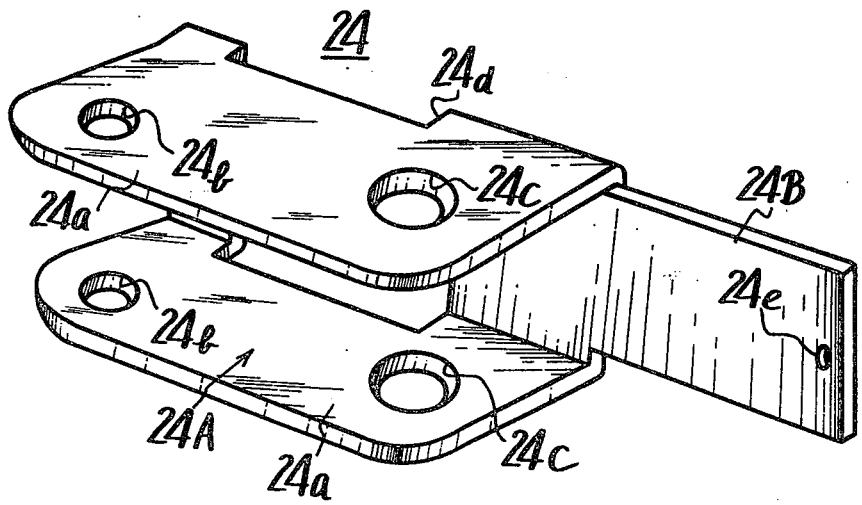

TAPE RECORDER WITH PIVOTAL ERASE HEAD BEARING

BACKGROUND OF THE INVENTION

1. Field of the Invention

The present invention relates to a tape recorder and particularly to an improvement in a cassette-type tape recorder of dual-capstan and 3-head system.

2. Description of the Prior Art

In a prior art cassette-type tape recorder of dual-capstan and 3-head system, an erasing head is insterted through one of bisymmetrical small windows at the front plate of the cassette, for example, a left small windows, while a recording head is inserted through a central opening and a reproducing head through the other small window or a right small window. In this case, however, an independent tape guide means has been necessary for guiding a tape correctly and for positioning the same. Accordingly, the conventional tape recorder has several independent components including a tape guide, a pinch roller, a pinch lever and the like which greatly deteriorate its mass-productivity.

SUMMARY OF THE INVENTION

A tape recorder according to the invention comprises an erasing head having a tape slidable contact portion whose thickness is substantially the same as a tape width, a bearing member for rotatably journaling a pinch roller, and a pinch lever for supporting the bearing member. The erasing head is provided with flanges for guiding a tape therebetween and being forwardly projected over upper and lower surfaces of the slidable contact portion. The bearing member is integrally formed with the erasing head so that the latter is partially faced to the peripheral surface of the pinch roller and the slidable contact portion is projected into the tape path. Further, the pinch lever and the bearing member are pivoted about a pinch roller shaft, while one part of the pinch lever is pivoted to a head base plate or the like to bias the pinch lever to a predetermined direction.

Accordingly, it is a main object of this invention to provide a tape recorder such that an erasing head to be inserted into an opening of the front surface of a tape cassette and a pinch roller mechanism for applying a tension to the tape are combined together to form a simple and reasonable structure.

It is another object of this invention to provide a tape recorder such that an erasing head has a tape slidable contact surface projected to the tape path side with one part of the erasing head being faced with the peripheral surface of a pinch roller.

It is a further object of this invention to provide a tape recorder such that an erasing head has upper and lower flanges which are projected over the slidable contact surface thereof for guiding the tape therebetween.

It is a still further object of this invention to provide a tape recorder such that a pinch lever for supporting a pinch roller mechanism is provided and pivoted about a pinch roller shaft together with the latter.

It is still further another object of this invention to provide a tape recorder such that its operation is stabilized and its characteristics are improved so as to enhance its mass-productivity.

The above and other objects and features of the invention will appear more fully hereinafter from a consideration of the following description taken in connection with the accompanying drawing wherein one example is illustrated by way of example.

DESCRIPTION OF THE PREFERRED EMBODIMENT

Figure 1:
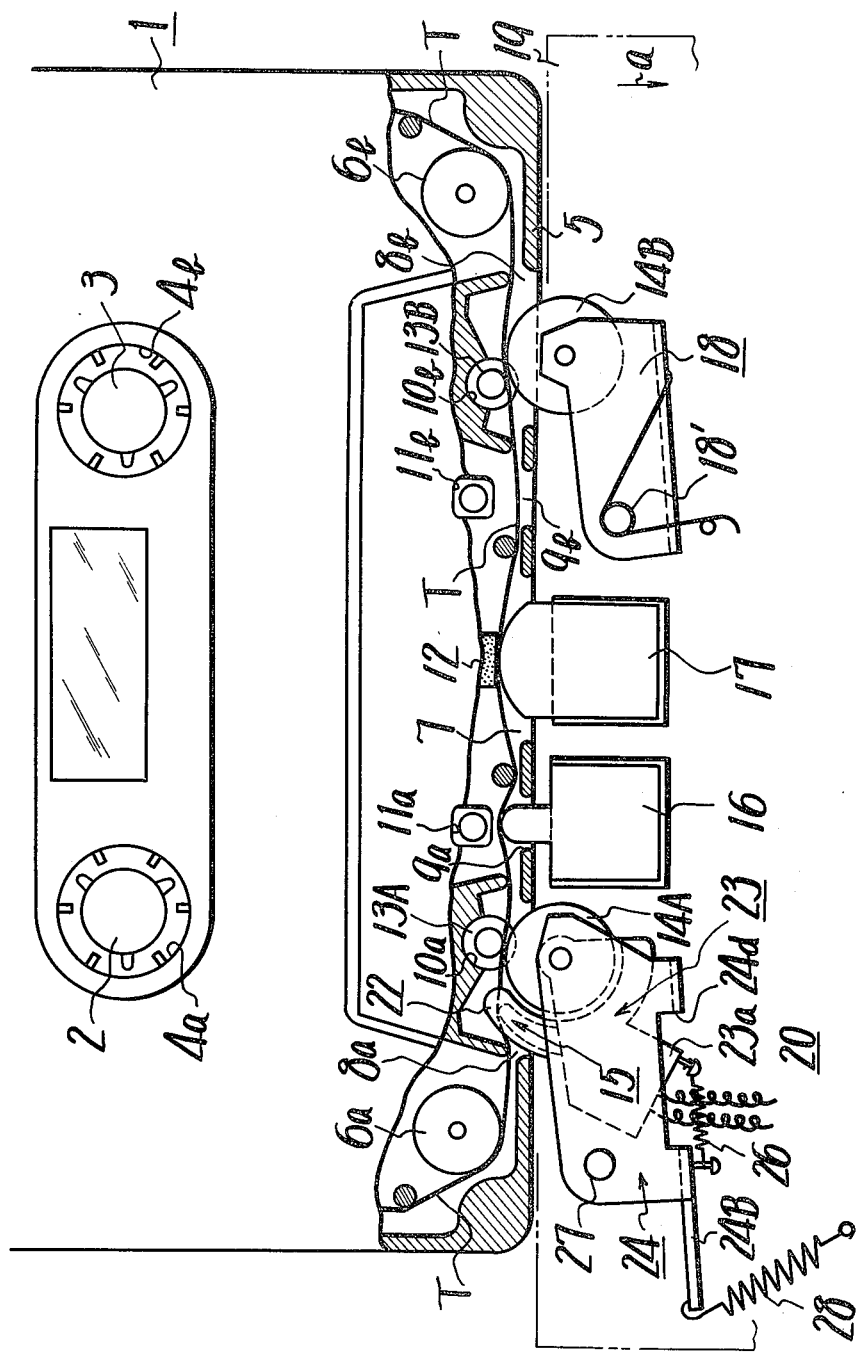
FIG. 1 is a schematic enlarged plan view showing the main part of a cassette-type recorder according to the invention, and FIGS. 2 to 5, inclusive, are exploded perspective views used for explaining the fabricating process of a specific structure according to the invention.

A description will hereinafter be given of an embodiment of the present invention with reference to the drawings.

FIG. 1 is the schematic enlarged plan view showing the main part of a cassette-type tape recorder of dual-capstan · closed loop · 3-head system according to the invention.

Since the dual-capstan · closed loop · 3-head system itself is already partially well known, its detailed description will be omitted, but only the construction related to the invention as illustrated will now be described. In FIG. 1, reference numeral 1 designates a standard-type tape cassette casing housed in the recorder at its predetermined position, 2 a supply reel shaft, 3 a take-up reel shaft, and 4(4a or 4b) a bore engageable with each reel shaft or a hub bore. A magnetic tape T wound about the supply reel hub in the casing 1 is extended between a pair of guide rollers 6 (6a and 6b) disposed inside a casing front plate 5 at its left and right corner portions and then wound about the take-up reel hub.

Reference numeral 7 represents a central opening of the front plate 5, 8 (8a 8b) symmetrical openings provided near the left and right ends of the front plate 5, 9 (9a and 9b) small windows provided at bysymmetrical positions respectively adjacent to the central opening 7, 10 (10a and 10b) capstan inserting bores, 11 (11a and 11b) cassette positioning bores, and 12 a pad disposed inside the central opening 7, all of them being normalized.

In the example of this invention, when the cassette is housed as illustrated, a pair of capstans 13A and 13B are inserted into the left and right capstan inserting bores 10 while a pair of pinch rollers 14A and 14B are rendered to be rotatively in contact with the respective capstans with the tape T being held therebetween. In short, this is the above mentioned dual-capstan. closed loop system in which a required tension is applied to the tape T between the capstans 13A and 13B to provide a proper sliding pressure of the tape T against three magnetic heads, particularly against a recording head, which will be hereinbelow described.

In FIG. 1, reference numeral 15 denotes an erasing head adapted to be inserted into the tape path inside the cassette casing 1 passing along the left peripheral surface of the pinch roller 14A at the left opening 8a, and 16 and 17 a recording head and a reproducing head respectively inserted into the tape path through the left small window 9a and central opening 7. Reference numeral 18 indicates an ordinary pinch lever which rotatably journals the pinch roller 14B and is biased to a counterclockwise direction about a pivot 18' on its base portion as is publicly known. Reference numeral 19 represents a head base plate which is shown by an imaginary line and adapted to be retracted in the direction of arrow a during non-playing time of the cassette tape.

For the above described tape recorder, in order to achieve the initially mentioned objects of this invention, the erasing head 15 and a pinch roller mechanism, which is provided for applying a tension to the tape and is adjacent to the erasing head, are combined to form a unit structure 20 (hereinafter referred to as an E-structure for convenience sake). The E-structure 20 is disposed on the head base plate 19. Thus, the illustrated E-structure 20 will be hereinbelow described in detail.

FIGS. 2 to 5, inclusive, are the exploded perspective views used for explaining its fabricating process. At first, in FIG. 2 reference numeral 21 represents an erasing head core which is constructed in such a manner that, in the illustrated example, the upper and lower surfaces of the core are finished by grinding so as to make the thickness $t$ of the whole core substantially the same as the width of the aforementioned tape T, and its base portion is provided with a known winding 21a while the opposite portion thereof is reduced in size to form an inserting portion 21b which is to be inserted into the opening 8a (refer to FIG. 1). In addition, a tape slidable contact surface 21' is formed at the tip of the inserting portion 21b and in this example the inserting portion 21b is curved at a certain curvature to the left in the figure. Reference 21c denotes a hard tip made of non-magnetic material which is provided as being faced to the end of the inserting portion, that is, double gaps g.

In the present invention, non-magnetic flanges 22 (22a and 22b) having the same configuration as illustrated are attached to the upper and lower surfaces of the inserting portion 21b of the core 21 by adhering, screwing or the like. These flanges serve to guide therethrough both edges of the tape passing on the slidable contact surface 21' of the core. As a result, the effective erasing operation is performed and the upper and lower edge positions of the tape T, which is transported as being held between the capstan 13A and pinch roller 14A, is correctly adjusted.

For this reason, at least one side edge of each of the flanges 22 is made round as indicated by R in accordance with the peripheral surface of the pinch roller 14A adjacent to the flanges, while the free end thereof is made smooth to form a semicircular end portion 22' which is rendered to project over the slidable contact surface 21' of the core by a required length. In the illustrated case, the whole flange is made as a circular piece and the base portion thereof is provided with a wide portion 22" for its connection with the core. Quality of material used in the flange may be a synthetic resin, a light alloy or other non-magnetic material. The erasing head 15 thus fabricated is shown in FIG. 3.

Next, in order to construct the erasing head 15 integrally with the above mentioned mechanism or bearing member 23 for the pinch-roller 14A, the bearing member 23 is formed as a mold member made of synthetic resin, by way of example, and the erasing head 15 is inserted into the bearing member 23 while the same is being molded. The above method is suited for mass-production and the combined member which is uniform in quality can be thereby obtained. It is needless to say that a specifically designed metal mold is used in such an insert molding method.

FIG. 4 shows an example of the bearing member 23 according to the insert molding method. The bearing member 23 is composed of an enclosure portion 23a, in which a portion of the erasing head 15 excluding the inserting portion 21b and the upper and lower flanges 22 is enclosed, and upper and lower fan-shaped plates 23b, which are projected from the enclosure portion 23a to the left in the figure. The pivot portions of both the fan-shaped plates 23b are formed with coaxial shaft bores 23c through which the pinch roller 14A is rotatably journaled. The inside of the inserting portion 21b of the erasing head 15 is designed to face along one part of the peripheral surface of the journaled pinch roller 14A. The lead wires of the erasing head are led out from the rear surface of the enclosure portion 23a (in the practical case, terminals are rendered being projected), and the arc portions of the upper and lower fan-shaped plates 23b, that is, the external peripheries thereof are closed. Reference 23d indicates a boss formed at the shaft bore portion on the exterior surface of each fan-shaped plate.

Thus, the bearing member 23 is inserted into a pinch lever 24 such as shown in FIG. 5. The pinch lever 24 is this example is made of press-finished plate and one part thereof is formed as a mounting portion 24A having U-shaped section. The mounting portion 24A consists of upper and lower plates 24a through which there are provided at the left portions with pivotal bores 24b respectively registered with the above mentioned shaft bores 23c of the bearing member 23, while at the right portions with pivotal bores 24c for mounting the pinch lever itself to the head base plate 9 of the recorder. The closed portion of the mounting portion 24A is formed with an escape aperture 24d. Further, the mounting portion 24A is extended to the right to form a lever 24B through which a small bore 24e is formed, for example, at its end portion to hook one end of a spring which is mentioned later on.

As is briefly described with reference to FIG. 1, at the left portion of the head base plate 9 there is disposed the E-structure 20 comprising the pinch roller 14A, the bearing member 23 (the molded member in which the erasing head 15 is inserted), and the pinch lever 24. Now, a description will be given on the assembled construction of the bearing member 23 and pinch roller 14A together with the pinch lever 24 and also the mounting process of the pinch lever 24 to the surface of the head base plate 9.

At first, the pinch roller 14A is interposed between the upper and lower fan-shaped plates 23b of the bearing member 23 at a predetermined position and the bearing member 23 under the above condition is interposed into the mounting portion 24A of the pinch lever 24. A pinch roller shaft 25 of a predetermined length is inserted from one of the pivotal bores 24b of the pinch lever through one of the shaft bores 23c of the bearing member 23 into the central bore of the pinch roller 14A. Then, the pinch roller shaft 25 is inserted through the other shaft bore 23c into the other pivotal bore 24b of the pinch lever 24 with the result that the pinch roller shaft 25 serves as the common shaft of the pivotal movement of the bearing member 23 and the rotation of the pinch roller 14A.

Next, a spring 26 is stretched between the rear surface of the enclosure portion 23a of the bearing member 23 which is partially exposed through the escape aperture 24d of the pinch lever 24 and one portion of the lever 24B of the pinch lever 24 thereby to apply a clockwise biasing force to the bearing member 23, that is, the erasing head 15. A pivot 27 planted on, for example, the head base plate 19 at its predetermined position is inserted into the pivotal bores 24c of the pinch lever 24 thereby to pivot the pinch lever 24. Further, a spring 28 is stretched between the small bore 24e at the end portion of the lever 24B and a pin or the like provided on one part of the head base plate 19 thereby to bias the whole E-structure 20 to a counterclockwise direction about the pivot 27.

With the above described construction of this invention, the bearing member 23 using the pinch roller shaft 25 as the common shaft is pivotally moved about the pinch roller 14A. In this case, a portion of the flange 22 of the erasing head 15 integrally constructed with the bearing member, that is, the inside of the inserting portion 21b, which is inserted into the cassette opening 8a, is faced along the peripheral surface of the pinch roller 14A, so that the tape T guided by the upper and lower flanges 22 forwardly projected over the slidable contact surface 21' thereof is correctly adjusted in its upper and lower positions on the peripheral surface of the pinch roller 14A. Accordingly, the tape T transported by the rotation of the capstan 13A and the pinch roller 14A with the same being held therebetween is stably traveled on its tape path. As a result, it is possible to improve the recording and reproducing characteristics of the tape recorder.

Thus, since the erasing head 15 performing such a tape guiding operation as well is brought into slidable contact with the surface of the tape T by a contact pressure different from the rotative contact pressure of the pinch roller 14A, erasing operation is performed particularly in an effective manner.

Anyhow, the major advantage of this invention lies in that the E-structure 20 is superior in accuracy due to the above mentioned construction and it is also possible to produce the same in quantities as a unit member. Accordingly, the invention is greatly useful in promoting the efficiency of assembling the elements of the tape recorders.

The embodiment mentioned above is of the case where the invention is applied to the cassette-type tape recorder of dual-capstan · 3-head system. In short, however, the main feature of the invention exists in the specific construction of the E-structure. Accordingly, if the E-structures are disposed bisymmetrically on the head base plate and a suitable design is provided including the selection of number of heads or the like, it is also possible to develop a reverse-system tape recorder.

Moreover, the above described embodiment of the respective components of the E-structure as well as the fabricating process thereof is only a simple example. In other words, it is also envisaged that the erasing head 15 and the bearing member 23 are not integrally constructed by the aforementioned insert molding method but two vertically symmetrical bearing members 23 are used so as to interpose the erasing head 15 therebetween, the both being coupled together. It is also possible that both the flanges 22 are attached to the erasing head 15 after the latter and the bearing member 23 are combined.

It will be apparent that a number of changes and variations can be effected without departing from the scope of the novel concepts of the present invention.

We claim as our invention:

1. Magnetic erasing head apparatus for use in a magnetic tape cassette recorder of the type which is operable with a magnetic tape cassette formed of a housing for magnetic tape and having a plurality of windows through which said tape is accessible, comprising:

a bearing member for supporting a pinch roller, said pinch roller being rotatably journaled in said bearing member;

a magnetic erasing head having at least a portion thereof mounted in and supported by said bearing member and having another portion thereof extending outwardly from said bearing member, said magnetic erasing head having a tape contact portion positioned at said another portion for slidably contacting said magnetic tape, said magnetic erasing head further having tape guide flanges positioned adjacent said tape contact portion for guiding said magnetic tape into slidable contact with said tape contact portion, said magnetic erasing head being mounted in said bearing member in juxtaposition with said pinch roller;

a pinch lever pivotally mounted in said recorder for pivotally supporting said bearing member and said erasing head mounted in said bearing member such that when said pinch lever is pivoted into an operative position with respect to said magnetic tape, said pinch roller and said erasing head are urged through one of said cassette housing windows into contact with said magnetic tape, said pinch roller advancing said tape past said tape guide flanges and in slidable contact with said erasing head; and means for pivotally mounting said bearing member on said pinch lever to thereby define a first pivot axis about which said bearing member pivots with respect to said pinch lever.

2. Magnetic erasing head apparatus in accordance with claim 1 wherein said magnetic erasing head includes an arcuate surface opposite said pinch roller so as to circumscribe a portion of said pinch roller.

3. Magnetic erasing head apparatus in accordance with claim 2 wherein said tape guide flanges are substantially flat members disposed in opposite parallel planes encompassing said tape contact portion therebetween and having curved edges to circumscribe a portion of said pinch roller.

4. Magnetic erasing head apparatus in accordance with claim 4 and further comprising biasing means for predeterminedly biasing said bearing member on said pinch lever to thereby urge said bearing member in a pivotal direction with respect to said pinch lever so as to urge said erasing head toward said magnetic tape.

5. Magnetic erasing head apparatus in accordance with claim 1 wherein said means for pivotally mounting said bearing member on said pinch lever comprises a pinch roller shaft about which said pinch roller rotates; and further comprising a pinch lever shaft which defines a second pivot axis about which said pinch lever pivots.

* * * * *